(12) United States Patent
Glasgow et al.

(10) Patent No.: US 11,132,656 B2
(45) Date of Patent: Sep. 28, 2021

(54) SYSTEM AND METHOD FOR MANAGING TRANSACTIONS IN A DIGITAL MARKETPLACE

(71) Applicant: eBay Inc., San Jose, CA (US)

(72) Inventors: Dane Glasgow, Los Altos, CA (US); Jack Phillip Abraham, Palo Alto, CA (US); Jonathan Leonard Conradt, Mercer Island, WA (US); Shannon B. Vosseller, San Francisco, CA (US); Max E. Metral, Brookline, MA (US)

(73) Assignee: eBay Inc., San Jose, CA (US)

( * ) Notice: Subject to any disclaimer, the term of this patent is extended or adjusted under 35 U.S.C. 154(b) by 340 days.

(21) Appl. No.: 16/029,028

(22) Filed: Jul. 6, 2018

(65) Prior Publication Data
US 2018/0336607 A1   Nov. 22, 2018

Related U.S. Application Data

(63) Continuation of application No. 13/340,494, filed on Dec. 29, 2011, now abandoned.

(51) Int. Cl.
| | |
|---|---|
| *G06Q 20/12* | (2012.01) |
| *G06Q 30/06* | (2012.01) |
| *G06Q 20/32* | (2012.01) |
| *G06Q 30/00* | (2012.01) |

(52) U.S. Cl.
CPC ..... *G06Q 20/1235* (2013.01); *G06Q 20/3276* (2013.01); *G06Q 30/0185* (2013.01); *G06Q 30/06* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 6,385,596 B1 | 5/2002 | Wiser et al. | |
| 6,947,900 B2 | 9/2005 | Giordano, III et al. | |
| 7,386,479 B2 | 6/2008 | Mizuno | |
| 7,613,919 B2 * | 11/2009 | Bagley | H04L 63/083 |
| | | | 713/155 |

(Continued)

OTHER PUBLICATIONS

"U.S. Appl. No. 13/340,494, Third Party Submission Under 37 CFR 1.290 dated Mar. 9, 2014", 2 pgs.

(Continued)

*Primary Examiner* — Jay Huang
(74) *Attorney, Agent, or Firm* — Schwegman Lundberg & Woessner, P.A (57) ABSTRACT

In various example embodiments, a system and method for managing transaction in a digital marketplace are provided. In example embodiments, a transaction request involving a digital good is received. A determination as to whether the transaction involves a purchase of the digital good is performed. Based on the transaction involving the purchase of the digital good, a further determination as to whether an overlap in inventory or a related item involving the digital good exists is performed. Based on the overlap in inventory existing, a sub-collection of the inventory is created with which to complete the transaction request. Based on existence of the related item, a combination package including the digital good and the related item is created and offered in response to the transaction request.

14 Claims, 9 Drawing Sheets

(56) References Cited

U.S. PATENT DOCUMENTS

| | | | |
|---|---|---|---|
| 8,560,461 | B1 | 10/2013 | Tian et al. |
| 2002/0161692 | A1 | 10/2002 | Loh et al. |
| 2003/0163390 | A1 | 8/2003 | Yang |
| 2003/0171962 | A1 | 9/2003 | Hirth et al. |
| 2006/0126848 | A1* | 6/2006 | Park ............... H04L 9/3228 380/277 |
| 2007/0043670 | A1* | 2/2007 | Dionne ............ G06Q 20/1235 705/51 |
| 2009/0319401 | A1 | 12/2009 | Rao et al. |
| 2012/0308003 | A1* | 12/2012 | Mukherjee ......... H04L 9/3247 380/243 |
| 2013/0173416 | A1 | 7/2013 | Glasgow et al. |

OTHER PUBLICATIONS

"U.S. Appl. No. 13/340,494, Concise Description of Relevance dated Mar. 9, 2014", 2 pgs.

"U.S. Appl. No. 13/340,494, Restriction Requirement dated Oct. 2, 2015", 6 pgs.

"U.S. Appl. No. 13/340,494, Response filed Dec. 1, 2015 to Restriction Requirement dated Oct. 2, 2015", 9 pgs.

"U.S. Appl. No. 13/340,494, Non Final Office Action dated Feb. 29, 2016", 11 pgs.

"U.S. Appl. No. 13/340,494, Response filed May 31, 2016 to Non Final Office Action dated Feb. 29, 2016", 19 pgs.

"U.S. Appl. No. 13/340,494, Final Office Action dated Sep. 6, 2016", 7 pgs.

"U.S. Appl. No. 13/340,494, Response Filed Jan. 6, 2017 to Final Office Action dated Sep. 6, 2016", 19 pgs.

"U.S. Appl. No. 13/340,494, Non-Final Office Action dated Sep. 7, 2017", 12 pgs.

"U.S. Appl. No. 13/340,494, Response filed Jan. 18, 2018 to Non-Final Office Action dated Sep. 7, 2017", 16 pgs.

"U.S. Appl. No. 13/340,494, Final Office Action dated Apr. 6, 2018", 11 pgs.

"U.S. Appl. No. 13/340,494, Response filed May 30, 2018 to Final Office Action dated Apr. 6, 2018", 14 pgs.

"U.S. Appl. No. 13/340,494, Advisory Action dated Jun. 20, 2018", 3 pgs.

Biggs, John, "Gumroad Lets You Sell Anything You Make", (12 14 11), 6 pgs.

Wallace, Benjamin, "The Rise and Fall of Bitcoin", Wired Magazine, (11 23 11), 1-9.

\* cited by examiner

SYSTEM AND METHOD FOR MANAGING TRANSACTIONS IN A DIGITAL MARKETPLACE

CLAIM OF PRIORITY

This Application is a continuation of U.S. application Ser. No. 13/340,494, filed Dec. 29, 2011, which is hereby incorporated by reference in its entirety.

FIELD

The present disclosure relates generally to transactions, and in a specific example embodiment, to managing transactions in a digital marketplace.

BACKGROUND

Conventionally, when users transact for digital goods, the user typically accesses different vendors to purchase the digital goods. The vendors may provide a digital license for access to the digital goods and may register the user as receiving the license. However, no further transactions involving the digital goods may be tracked or subsequent transfers of the digital licenses recorded.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a digital marketplace environment, the embodiments are given merely for clarity in disclosure. Thus, any type of electronic marketplace, publication, electronic commerce, social networking, or electronic business system and method, including various system architectures, may employ various embodiments of the content system and method described herein and may be considered as being within a scope of example embodiments. Each of a variety of example embodiments is discussed in detail below.

Example embodiments described herein provide systems and methods for managing transactions in a digital marketplace. In example embodiments, a transaction request involving a digital good is received. A determination as to whether the transaction involves a purchase of the digital good is performed. Based on the transaction involving the purchase of the digital good, a further determination as to whether an overlap in inventory or a related item involving the digital good exists is performed. Based on the overlap in inventory existing, a sub-collection of the inventory is created with which to complete the transaction request. In example embodiments, the sub-collection may comprise goods that do not overlap with inventory possessed by a user or goods that overlap with inventory possessed by a user which do not have licenses. The transaction request may be completed by facilitating a payment for the sub-collection.

Alternatively, based on existence of the related item, a combination package including the digital good and the related item is created and offered in response to the transaction request. The related item may comprise a different version or resolution of the digital good. A response from a user indicating whether the combination package is accepted is received. The transaction request for the combination package based on the user accepting the combination package is completed by facilitating payment for the combination package. Alternatively, the transaction request for the digital good based on the user not accepting the combination package is completed by facilitating payment for the digital good.

In further embodiments, a determination of whether the transaction is a request for currency exchange may be performed. Based on the transaction request being a request for currency exchange, an exchange rate is accessed and the transaction request is completed based on the exchange rate. In one embodiment, at least one currency being exchanged is a currency issued by a private entity (e.g., points or miles).

In another embodiment, the transaction request comprises a code for access to a digital version of an analog good in possession of a user. Accordingly, a determination as to whether the code is valid is performed. If the code is valid, then access to the digital version of the analog good is provided. However, if the code was previously used, a previous user of the code may be billed. Additionally, the code may be restored and access to the digital version of the analog good is provided to the user presently submitting the code.

By using embodiments of the present invention, a user will be provided efficient processing associated with digital goods transactions. Accordingly, one or more of the methodologies discussed herein may obviate a need for repeated processing to search for digital goods and complete a transaction for different digital goods from multiple different vendors or third parties, which may have the technical effect of reducing computing resources used by one or more devices within the system. Examples of such computing resources include, without limitation, processor cycles, network traffic, memory usage, storage space, and power consumption.

Figure 1:
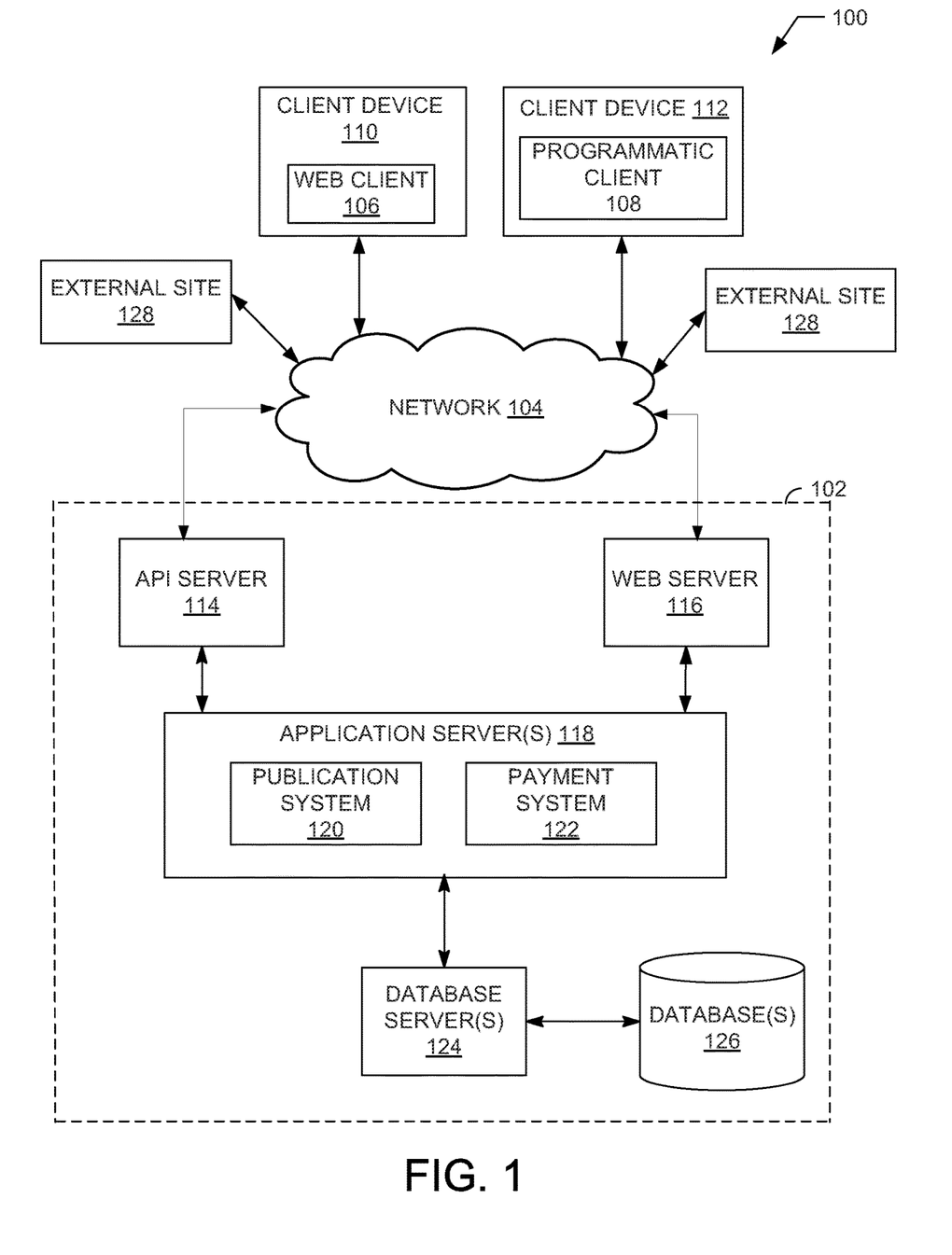
FIG. 1 is a block diagram illustrating an example embodiment of a network architecture of a system used to provide multi-dimensional personalization of search results.

With reference to FIG. 1, an example embodiment of a high-level client-server-based network architecture 100 to enable personalization of search results is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, camera, microphone, and GPS device. The client devices 110 and 112 may be a device of a user, which is used to perform a transaction involving digital goods within the networked system 102. In one embodiment, the networked system 102 is a network-based marketplace that manages digital goods, publishes publications comprising item listings of products available on the network-based marketplace, and manages payments for these marketplace transactions.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store information to be posted (e.g., publications or listings) to the publication system 120. The databases 126 may also store digital goods information in accordance with example embodiments.

In example embodiments, the publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational (e.g., search engine) or social networking environment.

The payment system 122 provides a number of payment services and functions to users. The payment system 122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
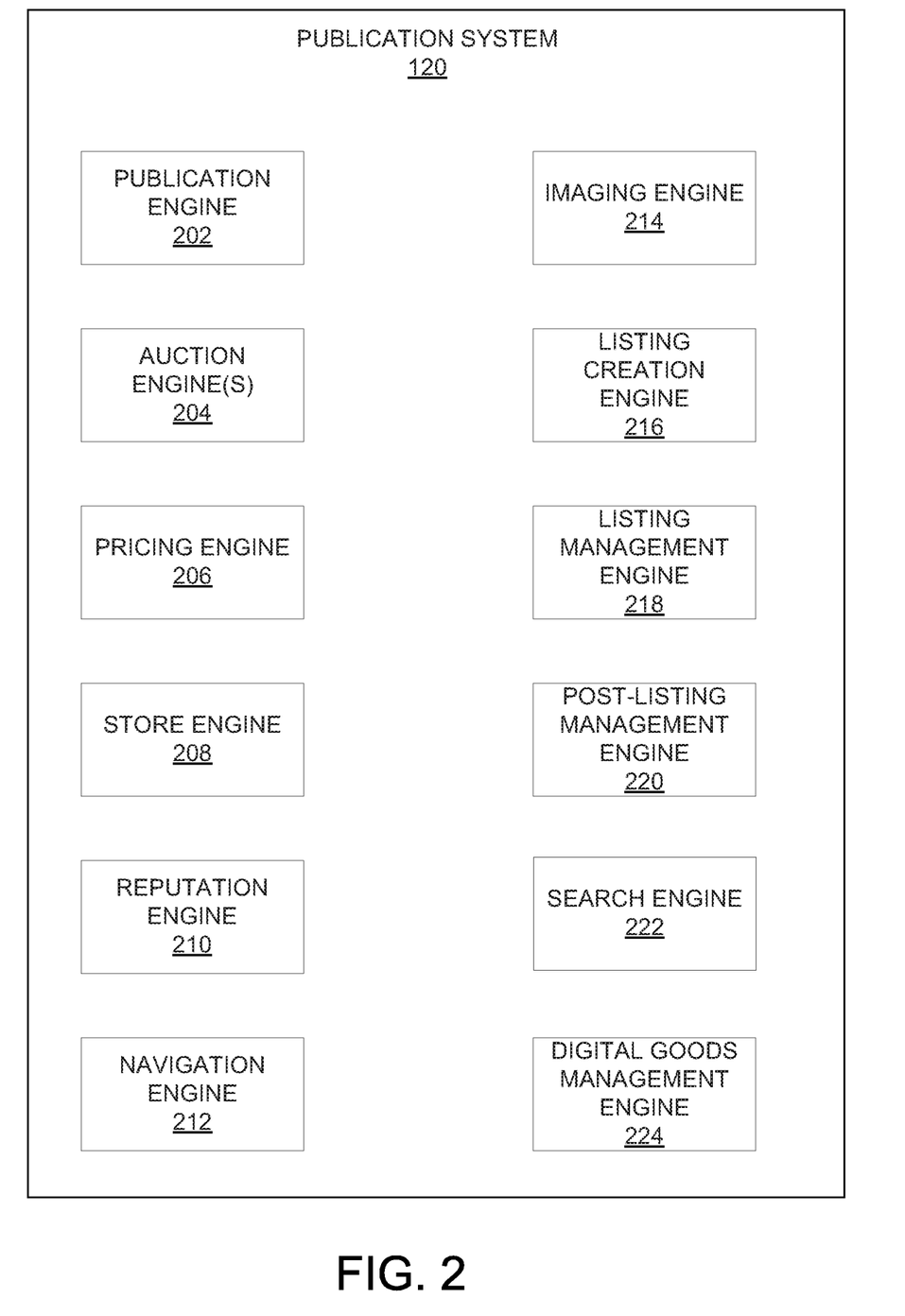
FIG. 2 is a block diagram illustrating an example embodiment of a publication system.

Referring now to FIG. 2, an example block diagram illustrating multiple components that, in one embodiment, are provided within the publication system 120 of the networked system is shown. In this embodiment, the publication system 120 is a marketplace system where items (e.g., goods or services) may be offered for sale. The items may comprise digital goods (e.g., currency, license rights). The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124.

The publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.).

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, in accordance with one embodiment, users may otherwise have no history or other reference information whereby the trustworthiness and credibility of potential trading partners may be assessed. The reputation engine 210 allows a user, for example through feedback provided by one or more other transaction partners, to establish a reputation within the network-based marketplace over time. Other potential trading partners may then reference the reputation for purposes of assessing credibility and trustworthiness.

Navigation of the network-based marketplace may be facilitated by a navigation engine 212. For example, a browse module (not shown) of the navigation engine 212 allows users to browse various category, catalog, or inventory data structures according to which listings may be classified within the publication system 120. Various other navigation applications within the navigation engine 212 may be provided to supplement the browsing applications.

In order to make listings available via the networked system 102 as visually informing and attractive as possible, the publication system 120 may include an imaging engine 214 that enables users to upload images for inclusion within publications and to incorporate images within viewed listings. The imaging engine 214 may also receive image data from a user as a search query and utilize the image data to identify an item depicted or described by the image data.

A listing creation engine 216 allows users (e.g., sellers) to conveniently author listings of items. In one embodiment, the listings pertain to goods or services that a user (e.g., a seller) wishes to transact via the publication system 120. In other embodiments, a user may create a listing that is an advertisement or other form of publication.

A listing management engine 218 allows the users to manage such listings. Specifically, where a particular user has authored or published a large number of listings, the management of such listings may present a challenge. The listing management engine 218 provides a number of features (e.g., auto-relisting, inventory level monitors, etc.) to assist the user in managing such listings.

A post-listing management engine 220 also assists users with a number of activities that typically occur post-listing. For example, upon completion of a transaction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210. Another post-listing action may be shipping of sold items whereby the post-listing management engine 220 may assist in printing shipping labels, estimating shipping costs, and suggesting shipping carriers.

A search engine 222 performs searches for publications in the networked system 102 that match a query. In example embodiments, the search engine 222 comprises a search module (not shown) that enables keyword searches of publications published via the publication system 120. In a further embodiment, the search engine 222 may take an image received by the imaging engine 214 as an input for conducting a search. The search engine 222 takes the query input and determines a plurality of matches from the networked system 102 (e.g., publications stored in the database 126). It is noted that the functions of the search engine 222 may be combined with the navigation engine 212.

A digital goods management engine 224 manages transactions in the networked system 102 involving digital goods. Digital goods comprise any item that involves a digital element such as, for example, currency and digital rights involving movies, music, literary works, or other digital information. The digital goods management engine 224 will be discussed in more detail in connection with FIG. 3 below.

Although the various components of the publication system 120 have been defined in terms of a variety of individual modules and engines, a skilled artisan will recognize that many of the items can be combined or organized in other ways and that not all modules or engines need to be present or implemented in accordance with example embodiments. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
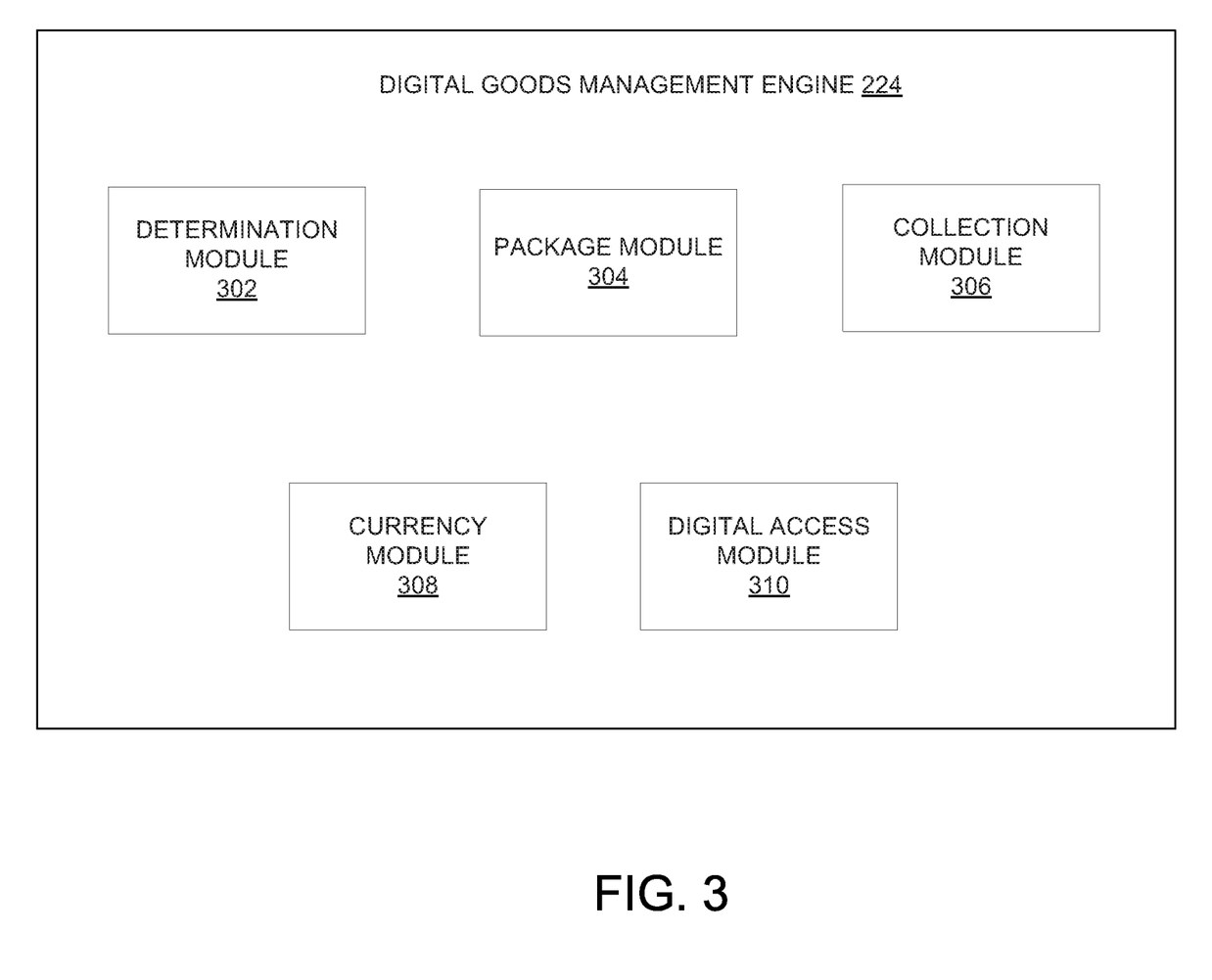
FIG. 3 is a block diagram illustrating an example embodiment of a digital goods management engine.

FIG. 3 is a block diagram illustrating an example embodiment of the digital goods management engine 224. The digital goods management engine 224 manages transactions involving digital goods. To that end, the digital goods management engine 224 comprises a determination module 302, a package module 304, a collection module 306, a currency module 308, and a digital access module 310 communicatively coupled together. One or more of the modules may be implemented in accordance with example embodiments.

The determination module 302 is configured to determine which digital goods operation to perform. Because the digital goods management engine 224 is capable of handling many different types of digital goods (e.g., digital rights, currency, digital information) and associated transactions, the determination module 302 determines the proper operation based on an analysis of a transaction request received from a user of the networked system 102. For example, if the transaction request involves currency, then currency processing by the currency module 308 may be involved and the determination module 302 may forward the transaction request to the currency module 308. Similarly, if the transaction involves a collection of digital goods, then the determination module 302 may forward the transaction to the collection module 306 for processing, while a transaction involving a purchase or licensing of a video or music (e.g., DVD, movie, CD) or other digital content (e.g., e-book, articles and subscription-based material, virtual goods) is forwarded to the package module 304. Furthermore, if the transaction involves an access request for a digital version of an analog good, the determination module 302 forwards the transaction request to the digital access module 310. Each of these modules and associated operations will be discussed in more detail below.

The package module 304 is configured to manage the packaging of different versions or resolutions of the same digital content to offer to a user. For example, if the user is purchasing a DVD, the package module 304 may determine if there is a package combination including the DVD available. The package combination may include the DVD and a Blu-Ray disc together, or the package may include the DVD and a corresponding CD (e.g., soundtrack). In another example, if the user is purchasing a CD, the package module 304 determines if a combination package including the CD and a digital version of the CD (e.g., audio files for MP3 device) is available. In some embodiments, the package module 304 generates the combination package when an associated version or resolution is available. For example, if the digital version of the CD is available, the package module 304 generates the combination package including both the CD and the digital version and returns an offer of the combination package to the user requesting the transaction.

The collection module 306 is configured to manage transactions involving a collection of digital goods. The collection of digital goods may comprise, for example, a collection of digital music, a collection of digital video (e.g., movies), a collection of e-books, or a combination of any of these collections. The collection module 306 receives the transaction request for a transaction involving a collection of digital goods and facilitates the transfer of license rights to the collection of digital goods from a seller to a buyer. Accordingly, the collection module 306 may communicate with a third party (e.g., grantor of the original license) to transfer the license rights to the buyer. Alternatively, the networked system 102 may maintain a record of the license rights and subsequent transfer of these license rights between parties (e.g., buyer and seller).

Furthermore, the collection module 306 may receive a transaction request to perform a comparison of a user's inventory with offered digital goods collections on the networked system 102 to determine overlaps in inventory. As such, the collection module 306 accesses the user's inventory (e.g., via a user account or on a user's client device). In some embodiments, a digital goods collection with an overlap in inventory may be permitted to be split by the collection module 306 to avoid a purchase of overlapping content. As such, a first sub-collection resulting from the split may have its license rights transferred to the buyer while a second sub-collection resulting from the split may be republished by the publication engine 202 for purchase. In other embodiments, the collection module 306 compares a user's inventory with a digital goods collection to determine which of the user's inventory is lacking license rights. The collections module 306 may suggest the purchase of the license rights from a digital goods collection available on the networked system 102.

The currency module 308 is configured to manage exchange of digital currency. Accordingly, the currency module 308 allows a user to trade one form of currency for another form of currency. In one embodiment, one of the forms of currency being traded is cash. The digital currency may be used to pay for real-world financial obligations (e.g., bills) as well as for virtual-world obligations. As such, the currency module 308 enables marketplace financial services to be provided via the networked system 102. The currency module 308 may maintain or access an exchange rate for conversion between two forms of currency and perform the conversion based on the exchange rate.

The digital access module 310 is configured to allow acquisition of digital rights corresponding to analog goods or content. For example, if a user owns a hard copy of a book, but wants to access the same book via an e-reader device, the user may obtain the digital rights to the digital version of the book based on the purchase of the hard copy version. In one instance, the book may have a machine readable code (e.g., quick response code) that is an individualized identifier for the instance of the book. In some embodiments, this identifier may be located behind a one-time surface such as a scratch-off covering or tear off flap. Furthermore, the identifier may be printed directly on the book (e.g., on an inside cover) or be applied by a merchant while the book is on the shelf or as it is purchased.

The digital access module 310 verifies the identifier received from a user. If the identifier is valid and has not been previously used, the user is provided digital rights to the digital version of the content. However if the identifier is valid but previously used, the digital access module 310 may determine that a user that previously used the identifier did not purchase the analog content. The user that previously used the identifier may now be charged for the content and the digital access module 310 may restore the one-time use identifier for the user who is the real buyer of the analog content.

Figure 4:
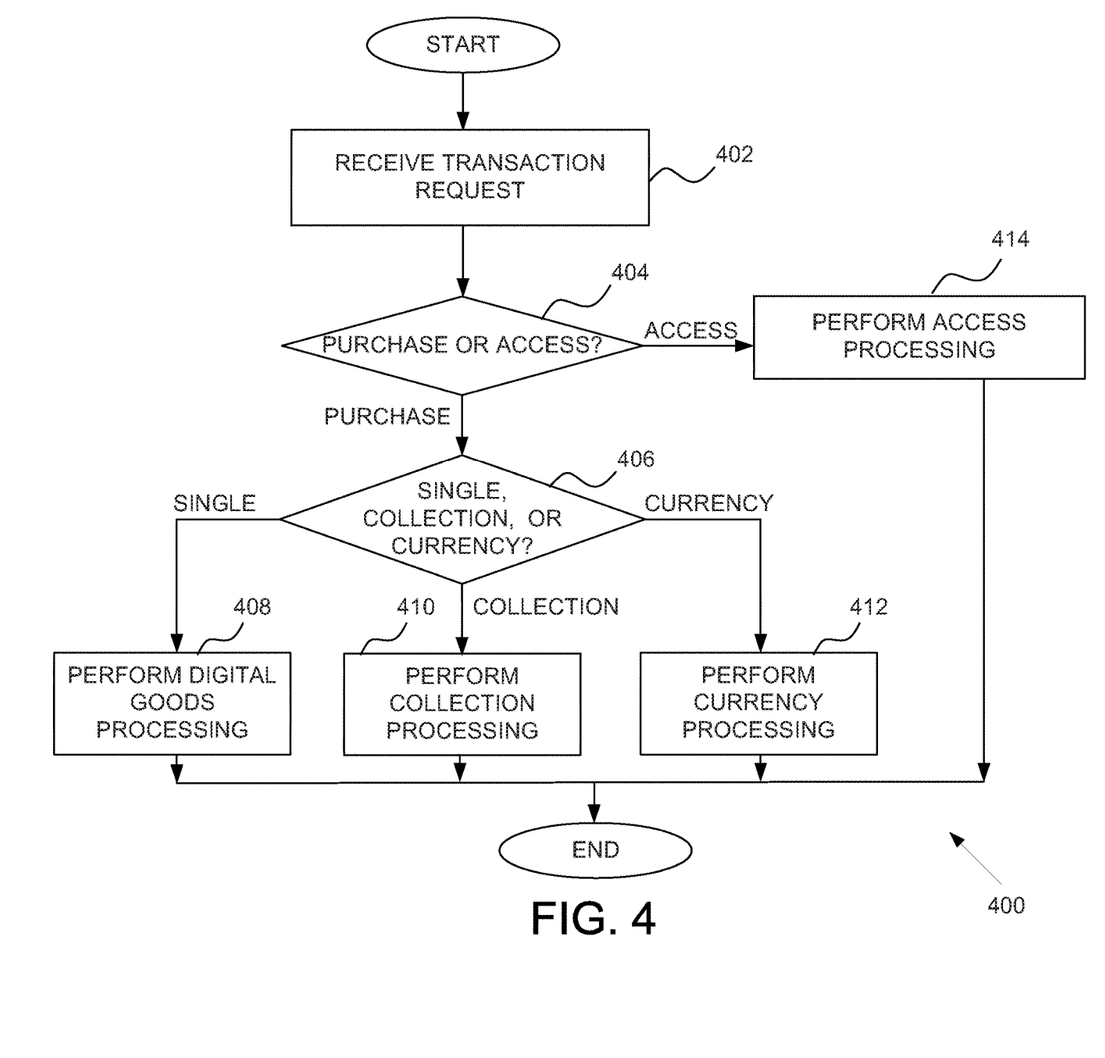
FIG. 4 is a flow diagram of an example high-level method for managing transaction involving digital goods.

FIG. 4 is a flow diagram of an example high-level method 400 for managing transaction involving digital goods. In operation 402, a transaction request is received by the networked system 102. The transaction request is received from a device associated with a user (e.g., buyer or seller) and indicates a request that is to be processed by the digital goods management engine 224.

In operation 404, the determination module 302 determines whether the transaction request involves a potential purchase transaction or a digital access request. If the transaction request involves a potential purchase transaction, then in operation 406, the determination module 302 determines what type of items or goods are involved. If the transaction involves a purchase of a single good, then a digital goods process is performed in operation 408. Alternatively, if the transaction involves a collection of goods, then a collection process is performed in operation 410. Further still, if the transaction involves currency, then currency processing is performed in operation 412. Each of operations 408, 410, and 412 will be discussed in more detail in connection with FIG. 5, FIG. 6, and FIG. 7, respectively.

Returning to operation 404, if the determination module 302 determines that the transaction request involves a request for digital access, then access processing is performed in operation 414. Operation 414 will be discussed in further detail in connection with FIG. 8 below.

Figure 5:
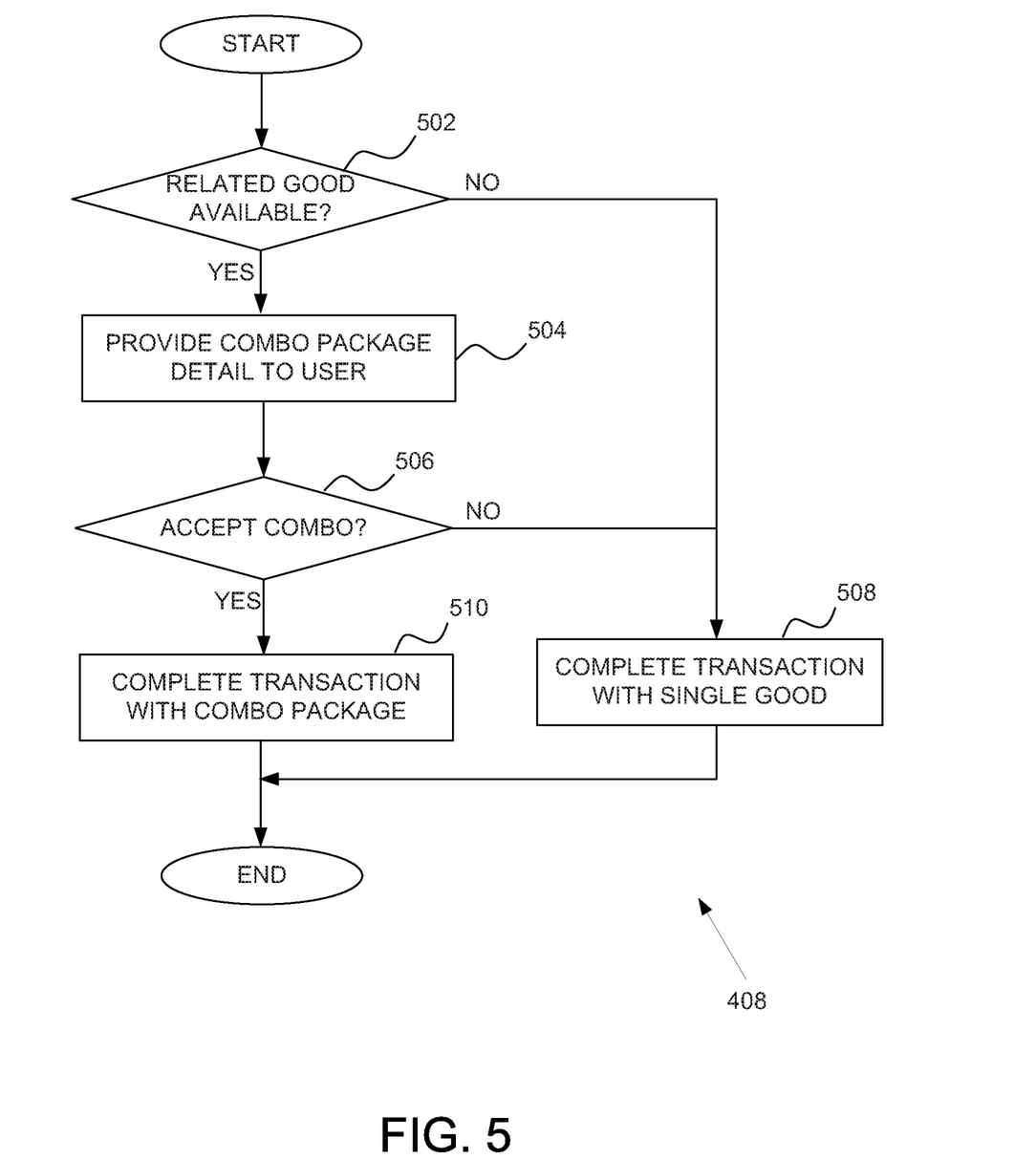
FIG. 5 is a flow diagram of an example high-level method for performing digital goods processing.

FIG. 5 is a flow diagram of an example high-level method (operation 408) for performing digital goods processing involving a single digital good. As such, the transaction request may indicate the single digital good that the user is interested in purchasing. Accordingly, the package module 304 determines, in operation 502, whether another good related to the digital good is available. The related good may comprise a different version or resolution of the digital good. In one embodiment, the package module 304 may search for these different versions or resolutions of the same digital good on the publication system 120. Alternatively, the different versions or resolutions of the digital good may be predetermined, and the package module 304 performs a look (e.g., on a table) to determine the predetermined different versions or resolution.

In some embodiments, the package module 304 may access a user profile associated with the user to determine whether the user has specified the types or capabilities of the devices owned by the user that can consume and process the digital good. For example, the user profile may identify that a user owns a Blu-Ray player or that a laptop that the user owns is capable of processing digital content of a certain resolution or encoding. The information in the user profile may be submitted by the user or may be gleaned from prior purchases made by the user within the marketplace (e.g., it may be inferred that the user owns a Blu-Ray player due to the fact that user previously purchased a Blu-Ray player from the marketplace). In some embodiments, the package module 304 may take user device capabilities into account when determining what versions or resolutions of the same digital good may be packaged with the digital good.

If a related good is available, then details of a combination package (including the digital good and the related good) are provided to the user as an offer in operation 504. In some cases, more than one combination package may be available and details regarding each of these combination packages may be provided to the user. The package module 304 then waits for a response from the user to determine, in operation 506, whether the user accepts one of the combination packages. If the user does not accept the combination package offer or if there is no combination package available, then the transaction is completed in operation 508 with only the singled digital good. The transaction may be completed by facilitating a payment from a buyer to the seller of the digital good. The payment may be facilitated by the payment system 122.

If the user accepts the offer, then the transaction is completed in operation 510 with the combination package. In some embodiments, the combination package may involve two different sellers each with one of the digital good in the combination package. In other embodiments, a single seller may provide both of the digital goods in the combination package. The transaction may be completed by facilitating a payment from the buyer to one or more sellers of the goods in the combination package.

While the combination package is discussed as having two related digital goods, it is contemplated that the combination package may have any number of related digital goods. For example, if the user request purchase of a DVD, the package combination offered by the package module 304 may include the DVD, a Blu-Ray, and a CD soundtrack. Further still, the combination package may include a non-digital good that is related to the digital good.

Figure 6:
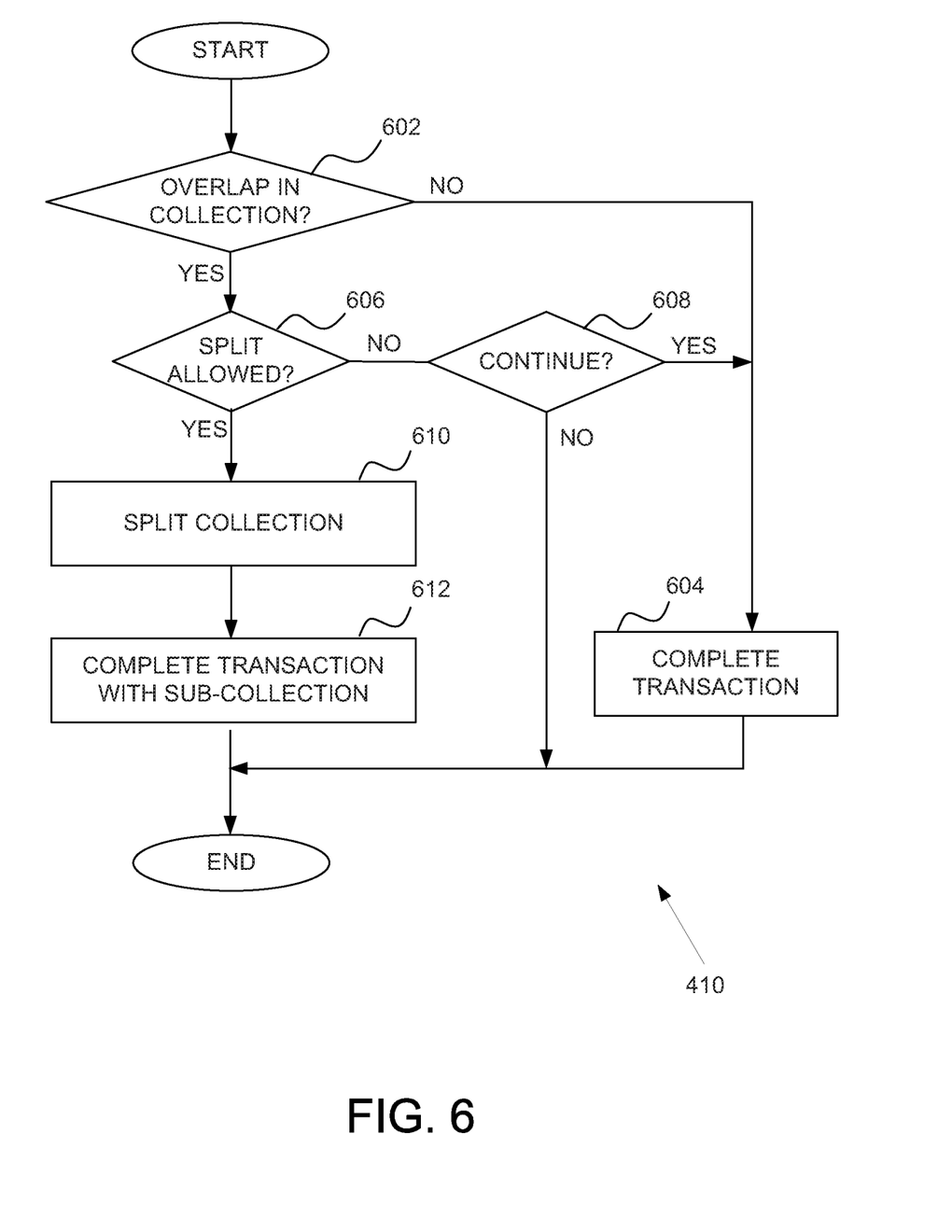
FIG. 6 is a flow diagram of an example high-level method for performing digital collection processing.

FIG. 6 is a flow diagram of an example high-level method (operation 410) for performing digital collection processing. In example embodiments, the collection module 306 performs a comparison of a user's inventory with offered digital goods collections on the networked system 102 to determine overlaps in inventory in operation 602. In some cases, the user may indicate one or more collections on the networked system 102 with which to perform the overlap determination. In alternative embodiments, the collection module 306 may compare the indicated user inventory with all available collections on the networked system 102 to find one or more collections with the least amount of overlap in the case where the user wants to purchase more items. Alternatively, the collections module 306 may find one or more collections with the most overlap in the case where the user wants to find license rights for items in the user's inventory that are missing licenses. As such, the collections module 306 may suggest the purchase of the license rights from a digital goods collection available on the networked system 102.

If no overlap is detected for an embodiment where the user has indicated a collection to perform the overlap determination with, the transaction may be completed in operation 604. As such, the user proceeds to pay for the entire collection and the license rights for the entire collection may be transferred to the user.

If an overlap is determined to exist in operation 602, then a determination as to whether the collection may be split is performed in operation 606. In example embodiments, seller of collections may indicate whether they are willing to split their collection for sale on the networked system 102. If the seller refuses split the collection, then the user (e.g., buyer) provides an indication, which is received in operation 608, as to whether to complete the transaction by purchasing the entire collection.

If the seller does allow the split in the collection due to the overlap, then in operation 610, the collection may be split into two or more sub-collections. In one embodiment, one of the sub-collections may comprise all the overlapping items in the collection while a second sub-collection may comprise all the non-overlapping items. The collection module 306 may automatically generate these sub-collections based on the results of the overlap determination operation 602. Alternatively, the user may be allowed to select the items from the collection that the user wants to purchase and send the selection to the collection module 306. Once the sub-collections are generated, the transaction may be completed by facilitating payment for one of the sub-collections in operation 612.

Figure 7:
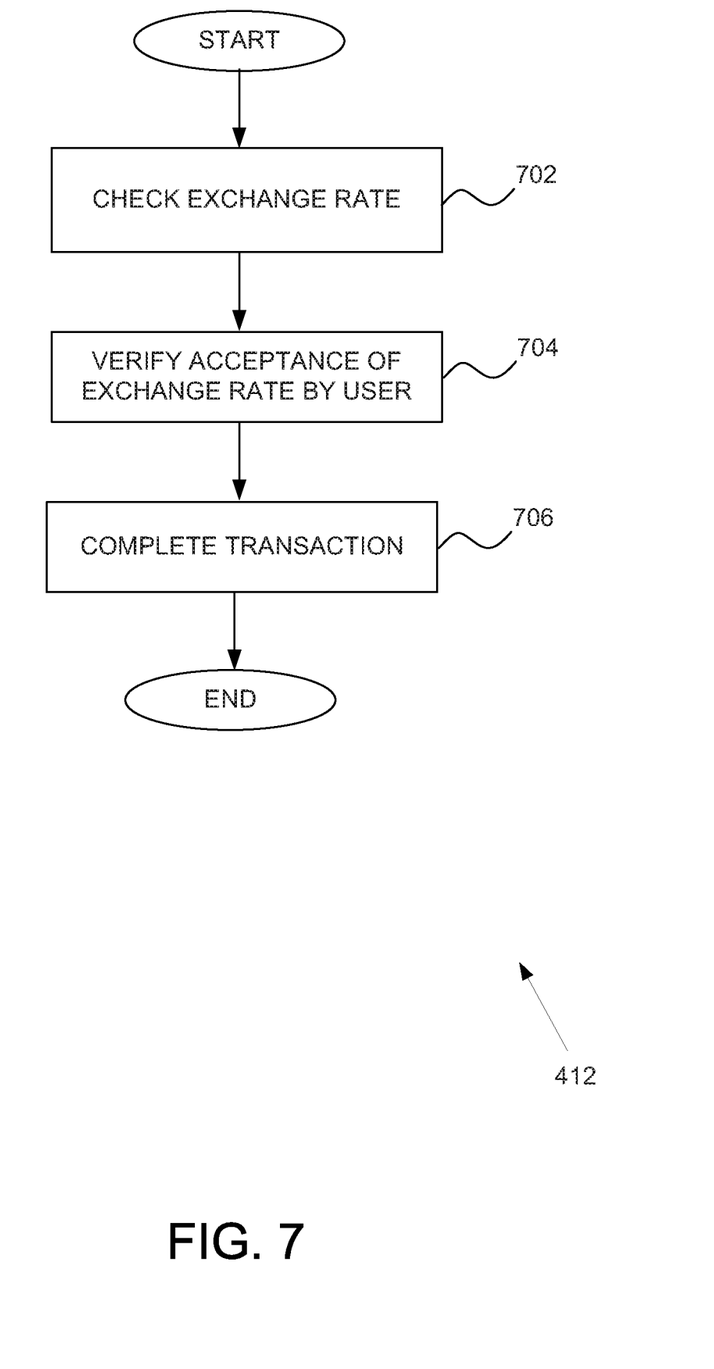
FIG. 7 is a flow diagram of an example high-level method for performing digital currency processing.

FIG. 7 is a flow diagram of an example high-level method (operation 412) for performing digital currency processing. In example embodiments, the transaction request indicating an amount in a first currency and a desired second currency is received by the currency module 308. A non-exhaustive and example list of currencies capable of being exchanged may include frequent flyer miles, loyalty and reward points (e.g., credit card reward points, hotel loyalty points, retail loyalty points), virtual currency, cash, Bitcoins, Facebook credits, eBay bucks, cash-equivalent currency (e.g., gift cards, travelers checks, cashier's checks), and any other form of currency. In operation 702, the currency module 308 checks an exchange rate for converting from the first currency to the second currency. The exchange rate information may be provided to the user for acceptance. In an alternative embodiment, the exchange rate may be provided to the user prior to receiving the transaction request (e.g., prior to the user generating the transaction request for the currency exchange).

In some embodiments, the currency module 308 maintains exchange rates for various combinations of currencies. The exchange rates may fluctuate based on supply and demand for the various currencies in the marketplace. In some embodiments, the currency module 308 may perform calls to external entities to determine exchange rates between currencies. For example, in the case that the currency module 308 does not have an exchange rate for two particular currencies, the currency module 308 may transmit a request to a third party to supply an exchange rate for the two currencies. In some embodiments, the third party exchange rates may influence and cause the exchange rates maintained by the currency module 308 to fluctuate, for example, to help minimize any exchange rate inefficiencies that may exist within the currency module 308.

In operation 704, the currency module 308 receives verification of acceptance of the exchange rate by the user. In some embodiments, the transaction request, itself, may be the verification. In these embodiments, operations 702 and 704 may be combined. The exchange of digital currencies thereafter may be carried out at the exchange rate agreed upon by the user.

Figure 8:
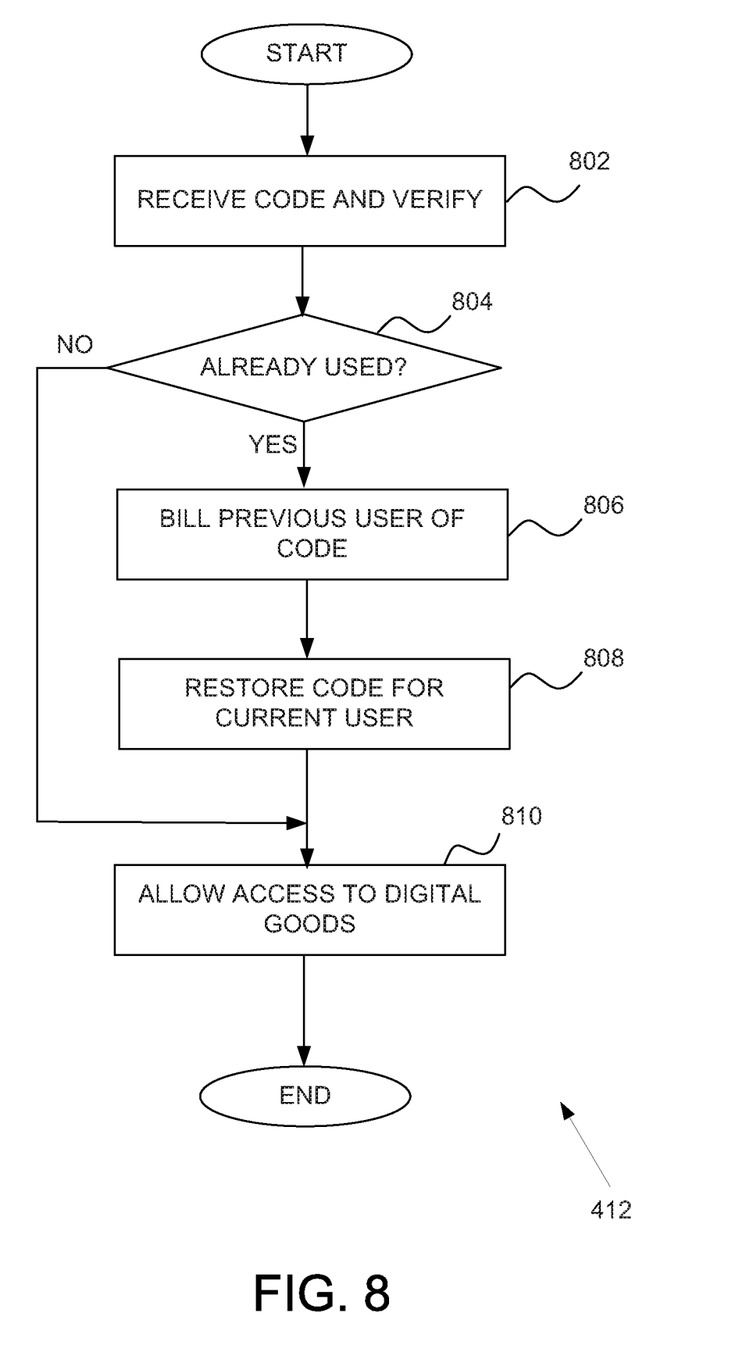
FIG. 8 is a flow diagram of an example high-level method for performing digital access processing.

FIG. 8 is a flow diagram of an example high-level method (operation 412) for performing digital access processing. In example embodiments, the transaction request includes a machine-readable code obtained from an analog good (e.g., hardcopy of book, DVD or CD). In some embodiments, the analog good may include a sticker, insert, imprinting or other notification that includes the machine-readable code. The machine readable code may serve as a proof of purchase or ownership of the analog good by a particular user. The transaction request is received by the digital access module 310 which verities the code in operation 802.

If in operation 804, the digital access module 310 determines the code has already been used, then in operation 806, the digital access module 310 may bill a previous user of the code for the previous use. As such, the digital access module 310 may determine that the previous user did not purchase the analog content and should now be charged for the content. In example embodiments, the digital access module 310 has access to a database of used codes and the users of these codes. As such, if a legitimate user provides a code that has been previously used, the previous user is likely an illegitimate user. The illegitimate user may then be identified and billed for the previous digital access.

In operation 808, the digital access module 310 restores the code such that the current (legitimate) user may now use the code to gain access to the digital version of the analog good. The access is then provided in operation 810 to the user.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations as described herein. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. The processor may be temporary configured or permanently configured to perform relevant operations. Whether temporarily configured or permanently configured, such processors may constitute processor-implemented modules that operate to perform one or more operations or functions.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 9:
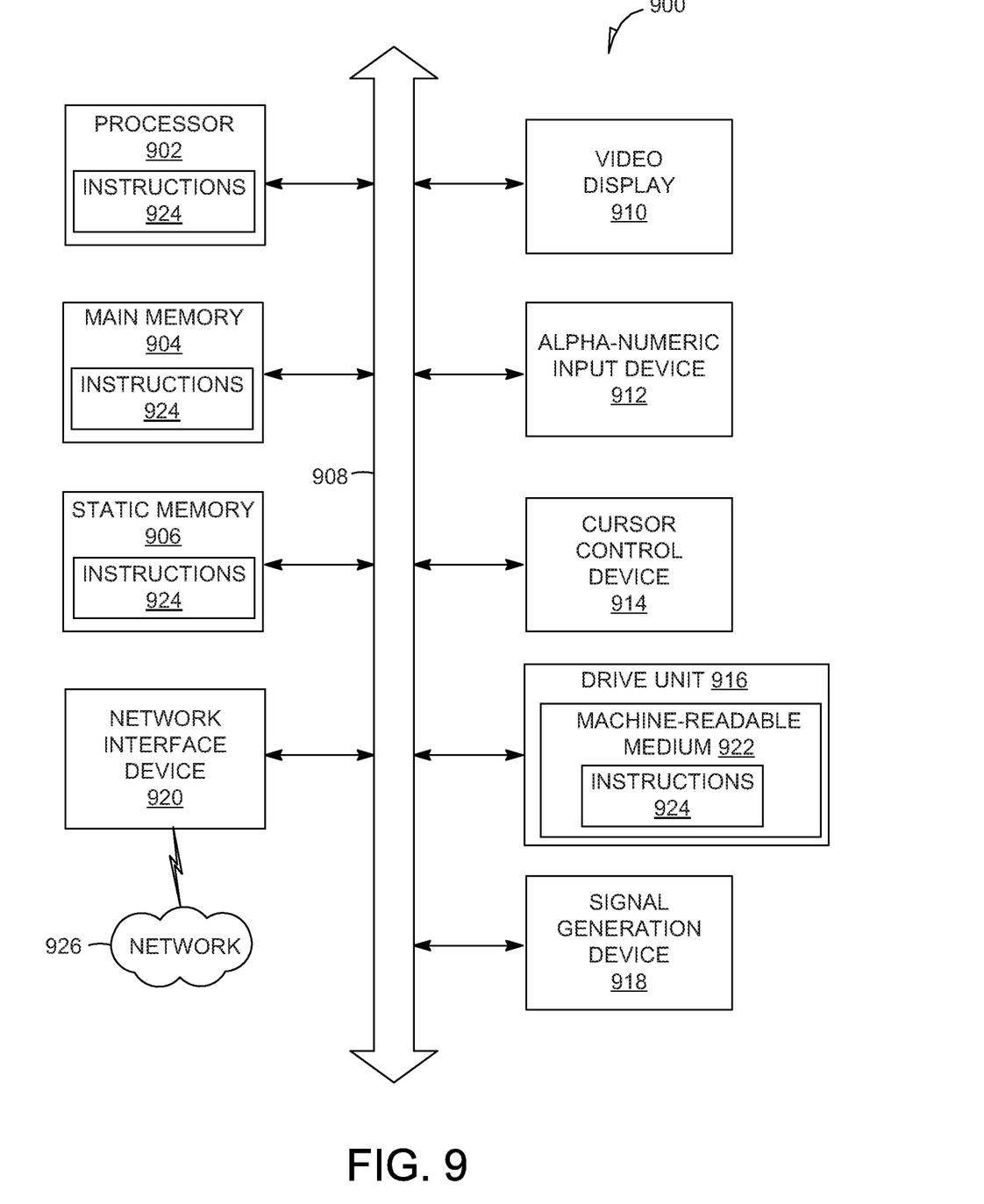
FIG. 9 is a simplified block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920, Machine-Readable Storage Medium The disk drive unit 916 includes a machine-readable storage medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, with the main memory 904 and the processor 902 also constituting machine-readable media.

While the machine-readable storage medium 922 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more hardware processors; and
a memory storing instructions that, when executed by the one or more hardware processors, cause the one or more hardware processors to perform operations comprising:
  receiving, by a digital goods management engine, a transaction request comprising a machine readable code scanned from a physical good of a first user;
  analyzing, by a determination module of the digital goods management engine, the transaction request to determine a component of the digital goods management engine to process the transaction request;
  based on the analyzing determining that the transaction request involves an access request for a digital version of content associated with the physical good, transmitting the transaction request to a digital access module of the digital goods management engine;
  processing, by the digital access module, the transaction request, the processing including verifying, by the digital access module of the digital goods management engine, whether the machine readable code is valid and has not been previously used by accessing a database of used machine readable codes and corresponding users; and
  in response to verifying that the machine readable code is valid and has been previously used:
    determining that a second user that previously used the machine readable code to access the digital version of the content did not purchase the physical good,
    charging the second user for previous access to the digital version of the content,
    restoring the machine readable code for the first user, and
    providing, to the first user, access to the digital version of content associated with the physical good.

2. The system of claim 1, wherein the providing access to the digital version of the content further comprises providing digital rights to the digital version of the content associated with the physical good.

3. The system of claim 1, wherein the machine readable code comprises a quick response (QR) code and the verifying whether the machine readable code is valid and has not been previously used comprises verifying whether the QR code is valid and has not been previously used.

4. The system of claim 1, wherein the machine readable code comprises an individualized identifier for an instance of the physical good.

5. The system of claim 1, wherein the machine readable code is a one-time use code.

6. The system of claim 1, wherein the operations further comprise, in response to verifying that the machine readable code is valid and has not been previously used, providing, to the first user, access to the digital version of content associated with the physical good.

7. A method comprising:
receiving, by a digital goods management engine, a transaction request comprising a machine readable code scanned from a physical good of a first user;
analyzing, by a determination module of the digital goods management engine, the transaction request to determine a component of the digital goods management engine to process the transaction request;
based on the analyzing determining that the transaction request involves an access request for a digital version of content associated with the physical good, transmitting the transaction request to a digital access module of the digital goods management engine;
processing, by the digital access module, the transaction request, the processing including verifying, by a hardware processor of the digital access module of the digital goods management engine, whether the machine readable code is valid and has not been previously used by accessing a database of used machine readable codes and corresponding users; and
in response to verifying that the machine readable code is valid and has been previously used:
determining that a second user that previously used the machine readable code to access the digital version of the content did not purchase the physical good,
charging the second user for previous access to the digital version of the content,
restoring the machine readable code for the first user, and
providing, to the first user, access to the digital version of content associated with the physical good.

8. The method of claim 7, wherein the providing access to the digital version of the content further comprises providing digital rights to the digital version of the content associated with the physical good.

9. The method of claim 7, wherein the machine readable code comprises a quick response (QR) code and the verifying whether the machine readable code is valid and has not been previously used comprises verifying whether the QR code is valid and has not been previously used.

10. The method of claim 7, wherein the machine readable code comprises an individualized identifier for an instance of the physical good.

11. The method of claim 7, wherein the machine readable code is a one-time use code.

12. The method of claim 7, further comprising, in response to verifying that the machine readable code is valid and has not been previously used, providing, to the first user, access to the digital version of content associated with the physical good.

13. A non-transitory machine readable medium storing instructions that, when executed by one or more hardware processors of a machine, cause the machine to perform operations comprising:
receiving a transaction request comprising a machine readable code scanned from a physical good of a first user;
analyzing the transaction request to determine a component of a digital goods management engine to process the transaction request;
based on the analyzing determining that the transaction request involves an access request for a digital version of content associated with the physical good, transmitting the transaction request to a digital access module of the digital goods management engine;
processing, by the digital access module, the transaction request, the processing including verifying whether the machine readable code is valid and has not been previously used by accessing a database of used machine readable codes and corresponding users; and
in response to verifying that the machine readable code is valid and has been previously used:
determining that a second user that previously used the machine readable code to access the digital version of the content did not purchase the physical good,
charging the second user for previous access to the digital version of the content,
restoring the machine readable code for the first user, and
providing, to the first user, access to the digital version of content associated with the physical good.

14. The non-transitory machine readable medium of claim 13, wherein the operations further comprise, in response to the verifying that the machine readable code is valid and has not been previously used, providing, by the digital access module of the digital goods management engine to the first user, access to the digital version of content associated with the physical good.

* * * * *